(12) United States Patent
Dortu

(10) Patent No.: US 7,047,371 B2
(45) Date of Patent: May 16, 2006

(54) INTEGRATED MEMORY HAVING A MEMORY CELL ARRAY CONTAINING A PLURALITY OF MEMORY BANKS, AND CIRCUIT CONFIGURATION HAVING AN INTEGRATED MEMORY

(75) Inventor: Jean-Marc Dortu, München (DE)

(73) Assignee: Infineon Technologies AG, Munich (DE)

( * ) Notice: Subject to any disclaimer, the term of this patent is extended or adjusted under 35 U.S.C. 154(b) by 292 days.

(21) Appl. No.: 10/409,012

(22) Filed: Apr. 8, 2003

(65) Prior Publication Data

US 2003/0191912 A1    Oct. 9, 2003

(30) Foreign Application Priority Data

Apr. 8, 2002    (DE)    ................. 102 15 362

(51) Int. Cl.
*G06F 13/00*    (2006.01)
(52) U.S. Cl. ................... 711/154; 711/5; 711/148; 711/168
(58) Field of Classification Search ............. 711/5, 711/154, 148, 168
See application file for complete search history.

(56) References Cited

U.S. PATENT DOCUMENTS

| 4,742,493 | A | * | 5/1988 | Lewallen et al. | ........ | 365/233.5 |
|---|---|---|---|---|---|---|
| 4,758,993 | A | * | 7/1988 | Takemae | ..................... | 365/222 |
| 5,659,711 | A | * | 8/1997 | Sugita | ......................... | 711/144 |
| 6,108,756 | A | * | 8/2000 | Miller et al. | ................. | 711/148 |
| 6,275,445 | B1 | * | 8/2001 | Dietrich et al. | ............. | 365/233 |
| 6,504,785 | B1 | * | 1/2003 | Rao | ..................... | 365/230.05 |
| 2002/0141268 | A1 | * | 10/2002 | Chou | ........................ | 365/222 |
| 2003/0185032 | A1 | * | 10/2003 | Zagorianakos et al. | ....... | 365/63 |

FOREIGN PATENT DOCUMENTS

EP    0 250 081 B1    2/1994

* cited by examiner

*Primary Examiner*—Matthew D. Anderson
*Assistant Examiner*—Hetul Patel
(74) *Attorney, Agent, or Firm*—Laurence A. Greenberg; Werner H. Stemer; Ralph E. Locher

(57) ABSTRACT

An integrated memory has at least two connection panels, which can be operated independently of one another, for external communication by the memory. In addition, a control circuit produces a number of first control signals and a number of second control signals for external tap-off. The number of first control signals corresponds to a number of memory banks. The first control signals are each associated with a memory bank and indicate that an associated memory bank is being accessed. The number of second control signals corresponds to the number of connection panels. One of the second control signals is produced if an access collision occurs between access to one of the memory banks via one connection panel and access to the same memory bank via another connection panel. Two processor units are connected to the connection panels and access the memory independently of one another on the basis of the control signals.

12 Claims, 8 Drawing Sheets

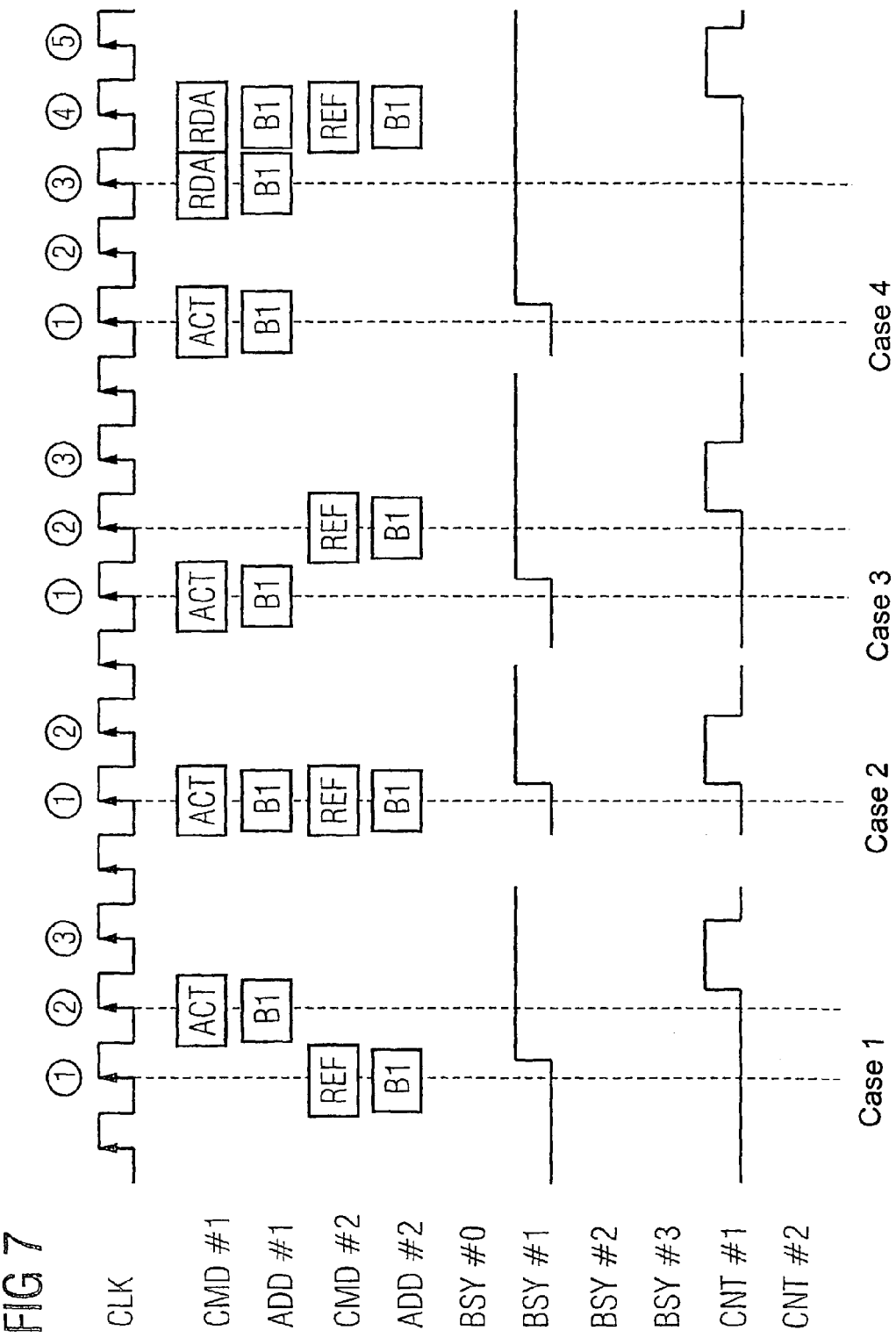

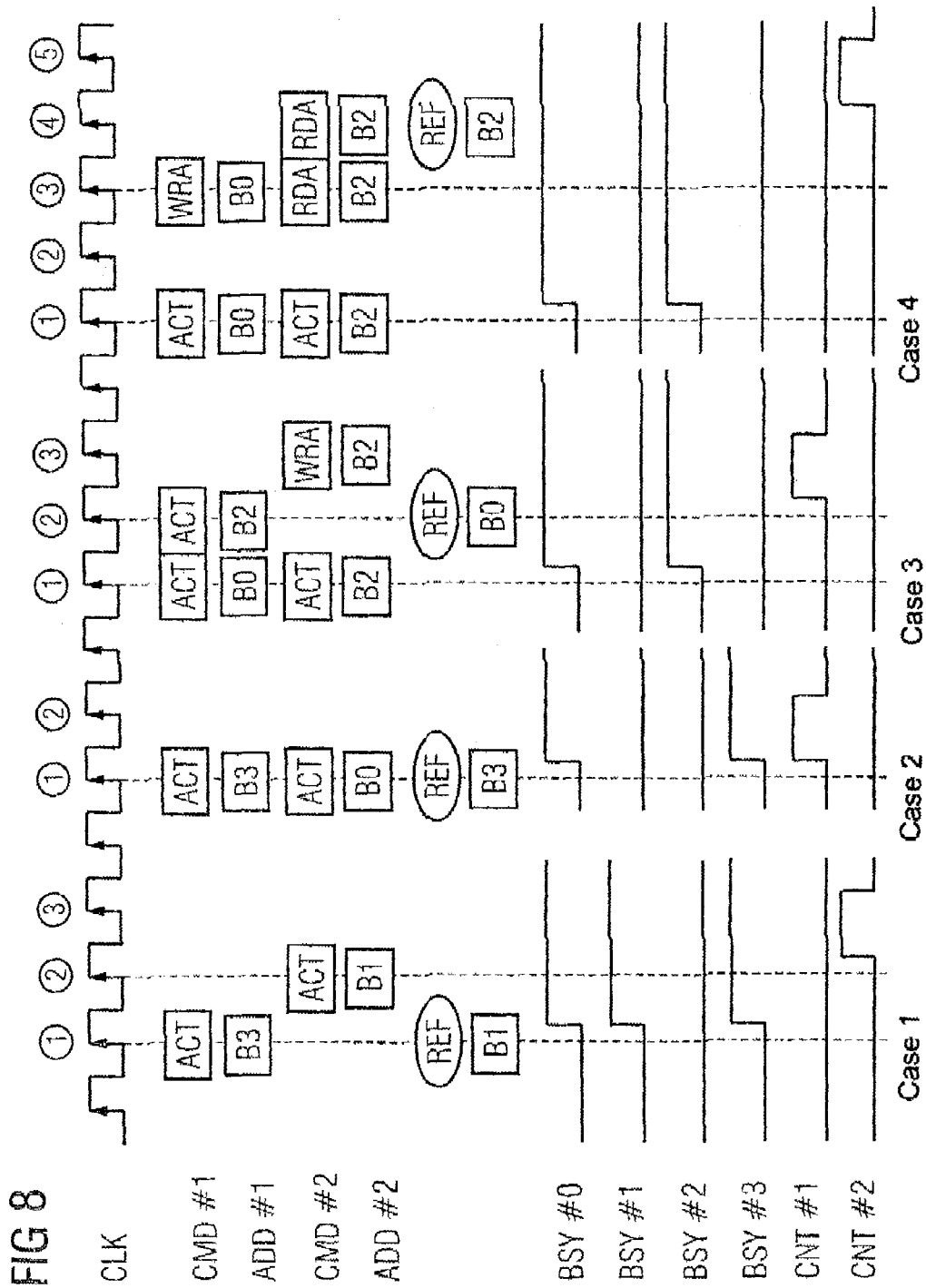

INTEGRATED MEMORY HAVING A MEMORY CELL ARRAY CONTAINING A PLURALITY OF MEMORY BANKS, AND CIRCUIT CONFIGURATION HAVING AN INTEGRATED MEMORY

BACKGROUND OF THE INVENTION

Field of the Invention

The present invention relates to an integrated memory having a memory cell array which contains a plurality of memory banks with respective memory cells. The invention further pertains to a circuit configuration having such an integrated memory.

Integrated memory devices, for example in the form of so-called DRAMs (Dynamic Random Access Memories), are generally operated in a system environment containing, by way of example, a processor or a controller which accesses the memory for the purpose of reading stored data or for the purpose of writing data which are to be stored. An integrated memory, particularly in the form of a DRAM, generally contains a memory cell array which is normally divided into a plurality of separate memory banks containing respective memory cells. In each of the memory banks, a respective row decoder and column decoder can be used for separately accessing the memory cells, organized in matrix form, for the purpose of reading data or for the purpose of writing data. In memory systems containing a plurality of processors or controllers, it has been customary up to now for each processor or controller to access a dedicated memory connected to it. This can mean, firstly, a comparatively high space requirement and secondly a comparatively high cost involvement, since a respective dedicated memory chip needs to be provided for a plurality of processors or controllers.

SUMMARY OF THE INVENTION

It is accordingly an object of the invention to provide an integrated memory and a circuit configuration with an integrated memory, which overcome the above-mentioned disadvantages of the heretofore-known devices and methods of this general type and which provides for an advantageous integrated memory that, when used in a system environment containing a plurality of processors or controllers, requires only a comparatively low amount of space. Furthermore, it is also an object of the present invention to specify a circuit configuration containing an integrated memory and a plurality of processors or controllers which allows a comparatively low space requirement.

With the foregoing and other objects in view there is provided, in accordance with the invention, an integrated memory, comprising:

a memory cell array containing a plurality of memory banks each with respective memory cells;

at least two independently operated connection panels each connected to a respective command and address bus and to a respective data bus for enabling external communication with the memory cell array; wherein each the data bus is connectible to each of the memory banks; and a control circuit for external access to the memory banks, the control circuit being configured to:

produce a number of first control signals corresponding to a number of the memory banks, the first control signals being associated with a respective one of the memory banks, and one of the first control signals respectively indicating if an associated the memory bank is being accessed; and produce a number of second control signals corresponding to a number of the connection panels, wherein one of the second control signals is produced if an access collision occurs between access to one of the memory banks via one of the connection panels and access to the one memory bank via another of the connection panels.

In line with the invention, an integrated memory of the type mentioned in the introduction also has two connection panels, which can be operated independently of one another, for external communication by the memory which are connected to a respective command and address bus and to a respective data bus. The respective data bus can be connected to each of the memory banks. In addition, a control circuit is provided which produces a number of first control signals and a number of second control signals for the purpose of external tap-off. The number of first control signals corresponds to the number of memory banks, with the first control signals being associated with a respective one of the memory banks. One of the first control signals respectively indicates if the associated memory bank is being accessed. The number of second control signals corresponds to the number of connection panels. One of the second control signals is produced if an access collision occurs between access to one of the memory banks via one of the connection panels and access to the same memory bank via another of the connection panels.

The invention thus provides a memory which allows two processors or controllers to access the memory independently of one another. Accordingly, the invention provides that, in a circuit configuration, at least two processor units, for example each in the form of a processor or controller, are respectively connected to a different one of the connection panels in the inventive integrated memory. The processor units respectively receive at least one of the first and second control signals and access the memory independently of one another on the basis of the first and second control signals. The invention thus allows a multiprocessor environment to contain just one integrated memory which can be accessed by a plurality of processor units independently of one another. This permits a comparatively space-saving circuit configuration.

In one embodiment of the invention, the processor units access different memory banks in the memory in parallel. This allows the processors to access the memory independently of one another at a high access speed without any waiting times, "wait states". Accordingly, there is no drawback as compared with memory systems which contain processors with respectively dedicated associated memories.

In accordance with an added feature of the invention, the control circuit is configured to produce one of the second control signals if an access collision occurs between access to one of the memory banks and a refresh mode on the same memory bank.

In accordance with an additional feature of the invention, the control circuit drives the memory cell array such that a given memory bank is connected to one of the connection panels if an access command on the command bus is applied to the one connection panel for accessing the given memory bank.

In accordance with another feature of the invention, upon access to one of the memory banks, the control circuit sets a control signal of the first control signals associated with the one memory bank and resets the control signal before access has ended. In a preferred embodiment, a control signal of the second control signals produced by the control circuit in the event of an access collision indicates which of the connection panels should be ignored for access to the memory banks.

In accordance with a further feature of the invention, there is provided an externally programmable register circuit for storing an information item regarding which of the connection panels is prioritized for access in an event of an access collision, and for outputting the stored information item to the control circuit.

With the above and other objects in view there is also provided, in accordance with the invention, a circuit configuration, comprising an integrated memory device as outlined above, and two or more processor units respectively connected to a different one of the connection panels. The processor units receive at least one of the first and second control signals, and access the memory independently of one another based on the first and second control signals.

In accordance with again an added feature of the invention, the two or more processor units access different memory banks concurrently, simultaneously, and in parallel.

In accordance with again an additional feature of the invention, an externally programmable register circuit of the memory is programmable by one of the processor units with an information item that defines which of the connection panels has priority for access in the event of an access collision.

In accordance with yet an added feature of the invention, the processor units and the memory interact such that a refresh mode for each of the memory banks can be controlled by one of the processor units. Alternatively, the memory is configured to enable a refresh mode to be controlled for each of the memory banks without involvement of the processor units.

In other words, the invention allows a "refresh mode" for refreshing the memory cell content in two ways. First, the processor units and the memory interact such that a refresh mode for each of the memory banks can be controlled by one of the processor units. Alternatively, the memory is designed such that a refresh mode for each of the memory banks can be controlled without the involvement of the processor units. Accordingly, the control circuit in the memory produces one of the second control signals if an access collision occurs between access to one of the memory banks and a refresh mode on the same memory bank.

In accordance with yet an additional feature of the invention, the processor units are configured to check, in each case before access to the memory, whether one of the first control signals has been set, and, if one of the first control signals has been set, not to access the memory bank that is associated with that first control signal.

In accordance with a concomitant feature of the invention, the processor units check, in each case before access to the memory, whether one of the second control signals has been set, and, if one of the second control signals has been set, not to access or to interrupt access via one of the connection panels.

Other features which are considered as characteristic for the invention are set forth in the appended claims.

Although the invention is illustrated and described herein as embodied in an integrated memory having a memory cell array containing a plurality of memory banks, and circuit configuration having an integrated memory, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 3 to 8 are respective signal diagrams to explain the operation of the memory and of the circuit configuration shown in FIG. 2.

DESCRIPTION OF THE PREFERRED EMBODIMENTS

Figure 1:
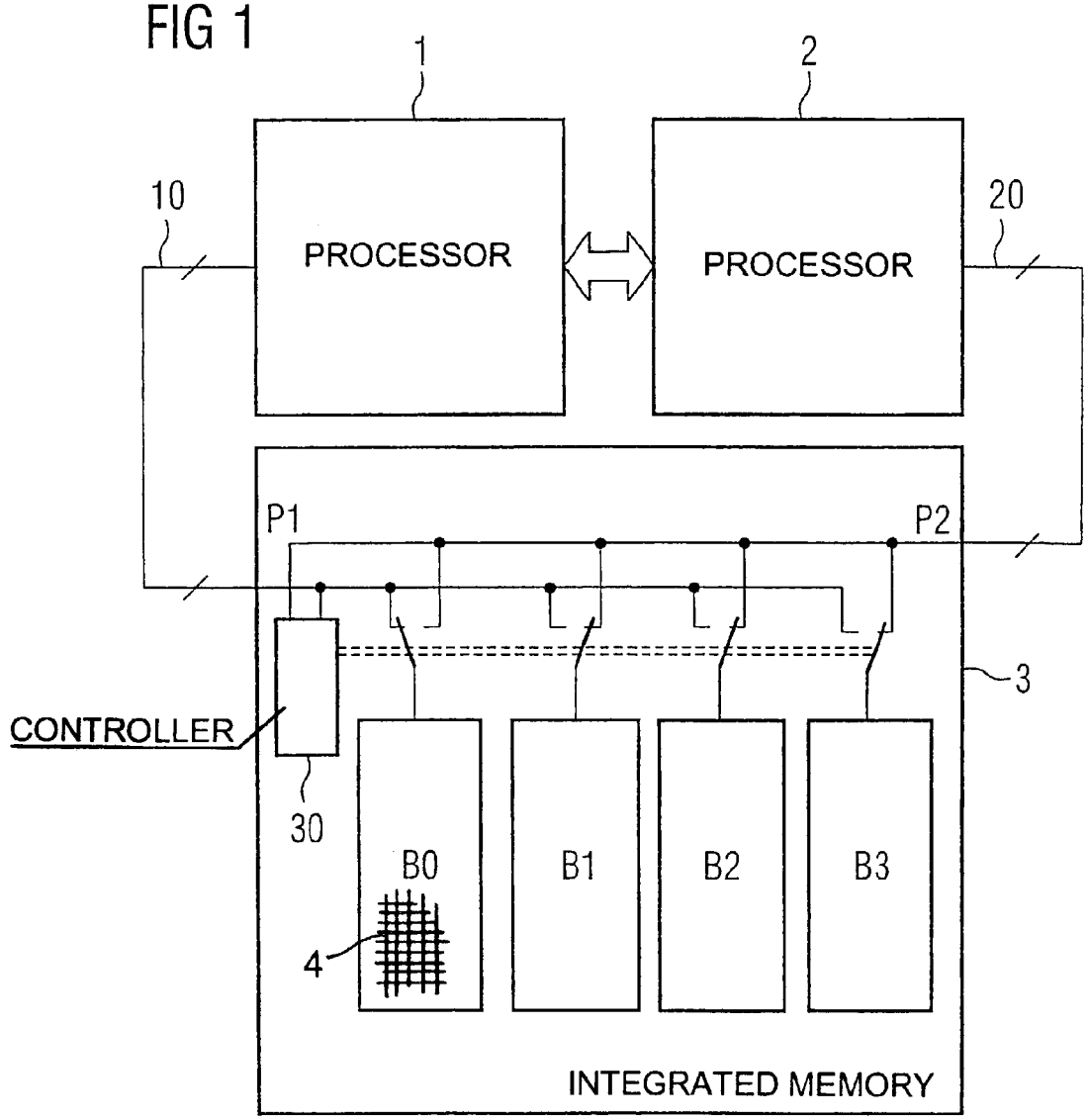
FIG. 1 is a block diagram of an embodiment of a circuit configuration according to the invention.

Referring now to the figures of the drawing in detail and first, particularly, to FIG. 1 thereof, there is shown a circuit configuration containing an integrated memory 3 which has a plurality of memory banks B0 to B3 containing respective memory cells. The memory cells are diagrammatically indicated as a small memory field 4 of columns and lines. The memory 3 also has two connection panels P1 and P2 which can be operated independently of one another and which are connected to a respective communication bus 10 and 20 for the purpose of external communication by the memory. Each of the communication buses 10 and 20 can be connected to each of the memory banks B0 to B3, shown symbolically by respective switch symbols that can be actuated by a control circuit 30.

Figure 2:
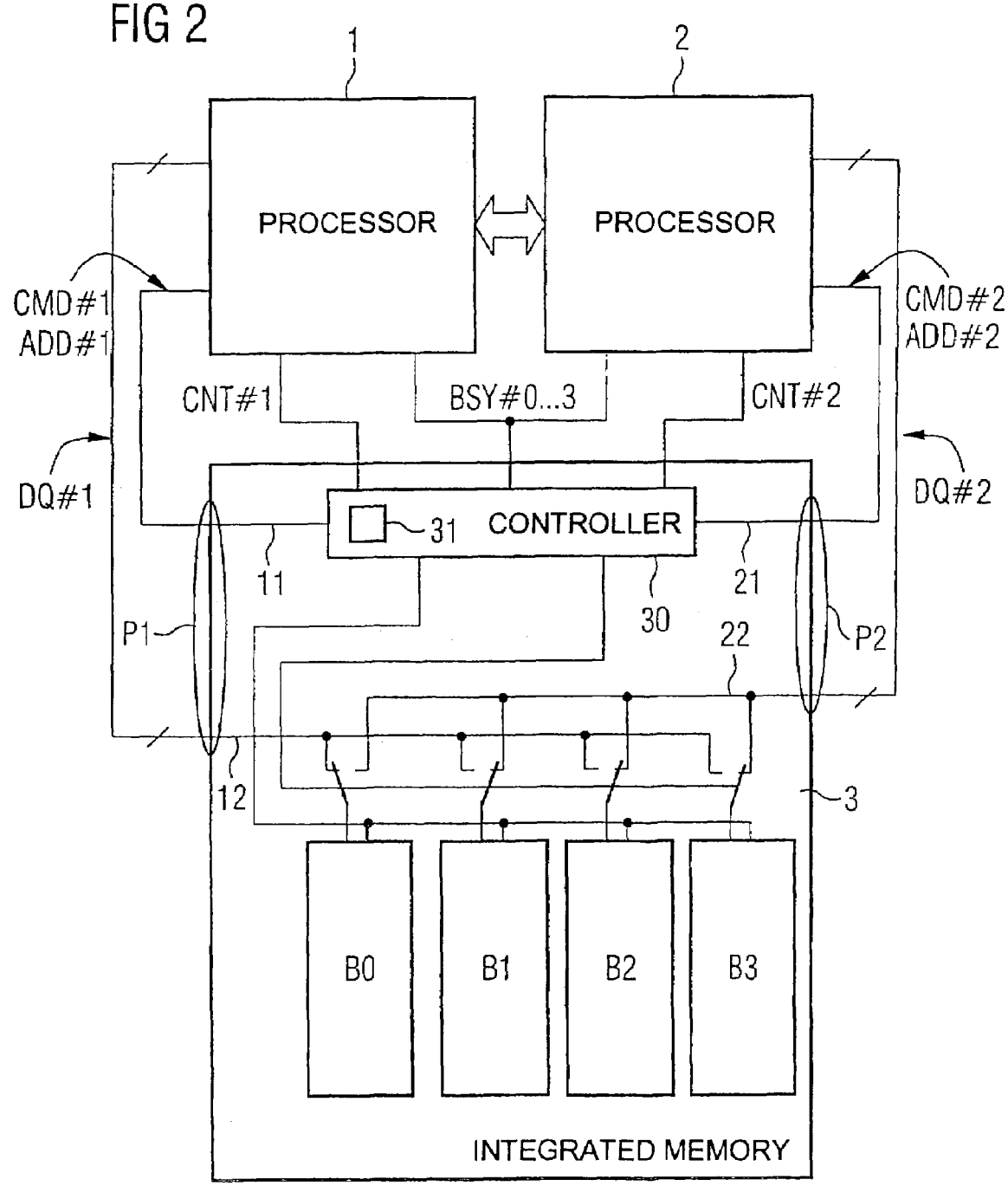
FIG. 2 is a more detailed block diagram of an embodiment of an integrated memory and of a circuit configuration according to the invention.

FIG. 2 shows a more detailed embodiment of the memory 3 and of the circuit configuration shown in FIG. 1. Each of the independently operable connection panels P1 and P2 is connected to a respective command and address bus 11, 21 and to a respective data bus 12, 22. The command and address bus 11 is used for transmitting command signals CMD#1 and address signals ADD#1 and is connected to the connection panel P1. The data bus 12 is used for transmitting data signals DQ#1 and is likewise connected to the connection panel P1. The command and address bus 21 is used for transmitting the command signals CMD#2 and address signals ADD#2 and is connected to the connection panel P2. The data bus 22 is used for transmitting the data signals DQ#2 and is likewise connected to the connection panel P2. The command and address bus 11 and the data bus 12 are connected to the processor unit 1, and the command and address bus 21 and the data bus 22 are connected to the processor unit 2. The respective data bus 12, 22 can be connected to each of the memory banks B0 to B3, likewise shown symbolically by switch symbols in FIG. 2.

The memory 3 contains a control circuit 30 which controls changeover of the data buses 12, 22 for the purpose of connection to the respective memory banks B0 to B3 and also controls access to the memory cells in the respective memory banks B0 to B3. The control circuit 30 is connected to the respective command and address bus 11, 21. The control circuit 30 also produces a number of first control signals BSY#0 to BSY#3 which corresponds to the number of memory banks B0 to B3. The control signals BSY#0 to BSY#3 are respectively associated with one of the memory banks and respectively indicate if the associated memory bank is being accessed. In addition, the control circuit 30 produces a number of second control signals CNT#1, CNT#2 which corresponds to the number of connection panels P1, P2. One of the control signals CNT#1, CNT#2 is produced if an access collision occurs between access to one of the memory banks via one of the connection panels P1, P2 and access to the same memory bank via the respective other one of the connection panels P1, P2. The control signals BSY#0 to BSY#3 and CNT#1, CNT#2 are made available on external connections of the memory 3 and are tapped off by the processor units 1 and 2. These respectively receive the control signals and access the memory 3 independently of one another on the basis of these control signals.

In addition, the memory 3 has a register circuit 31 which is in the form of a "mode register set" (MRS), in particular. The register circuit 31 is used, inter alia, for storing an information item regarding which of the connection panels P1, P2 has priority for access in the event of an access collision. In one advantageous embodiment, the externally programmable register circuit 31 is programmed by one of the processor units 1, 2 ("master processor") with an information item regarding which of the connection panels P1, P2 has priority for access in the event of an access collision. The information item stored in the register circuit 31 is forwarded to the control circuit 30.

The text below explains the operation of the memory configuration shown in FIG. 2 in more detail with reference to the signal diagrams shown in FIGS. 3 to 8.

The access commands ACT transmitted with the command signals CMD#1, CMD#2 signify that a memory bank needs to be activated for access. The commands RDA and WRA signify read access with "autoprecharge" and write access with autoprecharge, respectively. The command REF signifies initiation of a refresh cycle for implementing a refresh mode. The signals transmitted with the address signals ADD#1, ADD#2 signify access to the respective memory bank B0 to B3 in the memory 3. The control signal BSY#0 is associated with the memory bank B0, the control signal BSY#1 is associated with the memory bank B1, and so on. In the present example, the memory 3 is in the form of a synchronous dynamic memory (control clock CLK), an "SDRAM". In the present example, it is operated on the basis of a double data rate architecture (DDR DRAM), but the mode of operation shown can be transferred analogously to a single data rate architecture.

Figure 3:
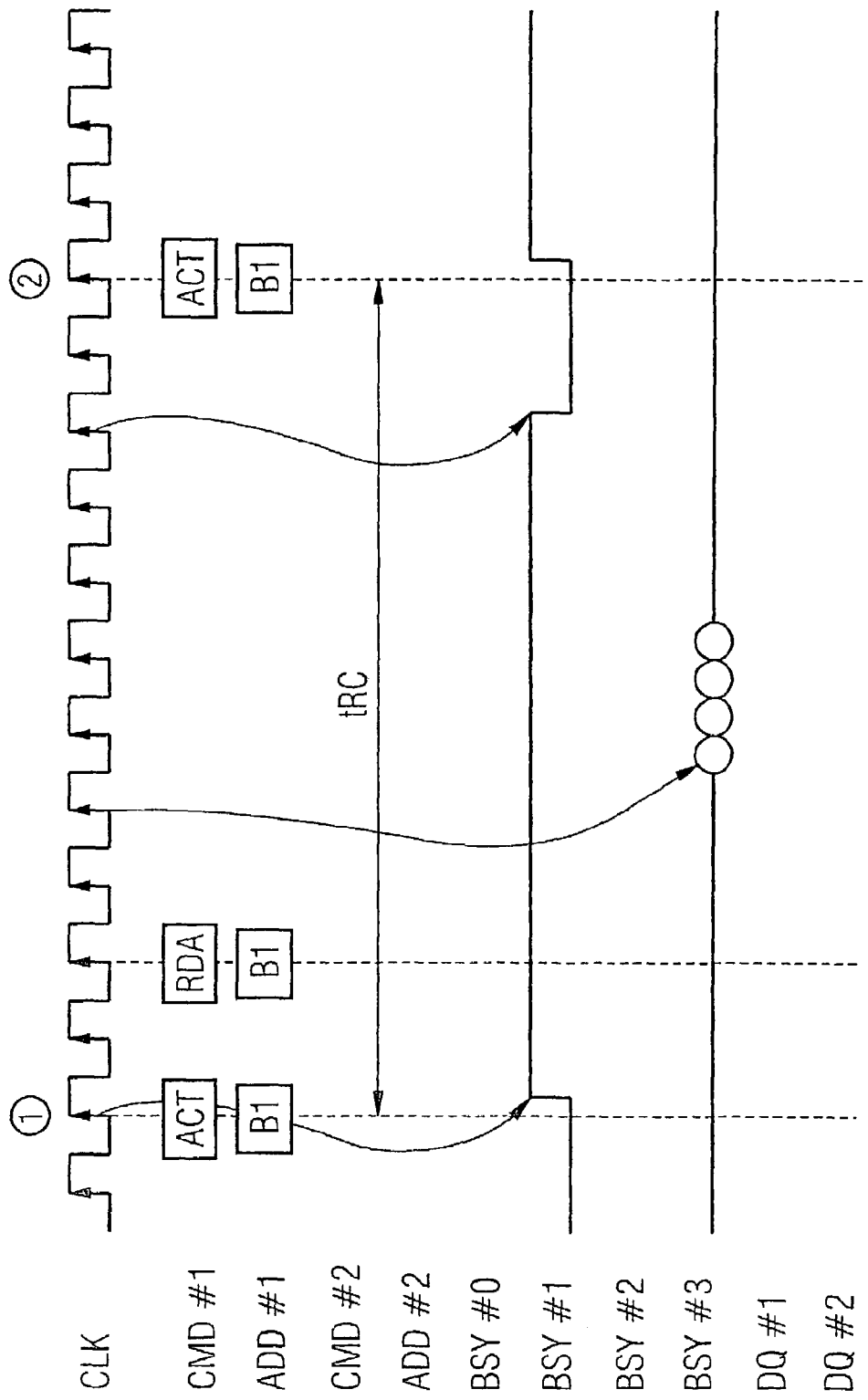

According to FIG. 3, the memory bank B1 is accessed using the access command ACT. In this case, access is controlled by the control circuit 30 in line with the memory shown in FIG. 2 by virtue of the memory bank B1 being connected to the connection panel P1 when the access command ACT on the command bus 11 is applied to the connection panel P1 for the purpose of accessing the memory bank B1. As soon as the access command ACT is received by the connection panel P1, also referred to as a port, the control signal BSY#1 is set by the memory. When the "row cycle time" tRC (cycle time required in an access cycle for the purpose of activating a word line) minus two clock periods of the clock signal CLK has elapsed, the control signal BSY#1 is reset by the control circuit 30 before access has ended. The processor units 1, 2 check, in each case before access to the memory, whether one of the control signals BSY has been set. If the respective control signal BSY has not been set, the memory bank in question can be accessed again in the next clock cycle. In the case shown in FIG. 3, when tRC has elapsed, the processor unit 1 checks whether the control signal BSY#1 has been set. This signal has not been set at time (2), which means that the memory bank B1 can be accessed again. In line with the read command RDA, the previous access to the memory bank B1 involves data in this memory bank being output on the data bus 12.

Figure 4:
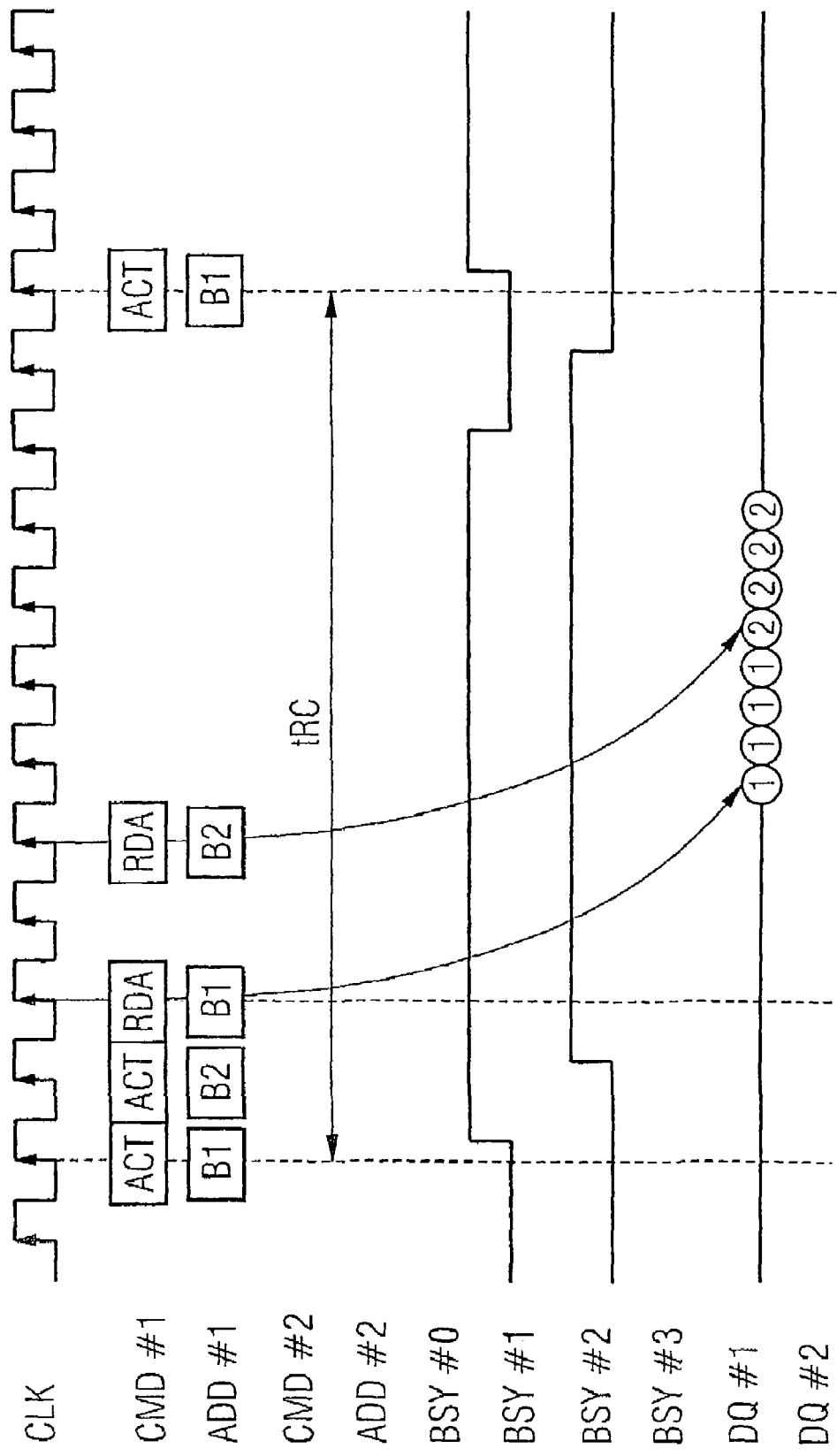

In another case, in line with FIG. 4, two access commands ACT for the memory bank B1 and for the memory bank B2 are output. Accordingly, the control signals BSY#1 and BSY#2 are set in succession. As a result of the read commands RDA for memory banks B1 and B2, the data in the memory banks B1 and B2 are output in succession via the port P1. When the control signal BSY#1 has been reset, the memory bank B1 can be accessed further.

Figure 5:
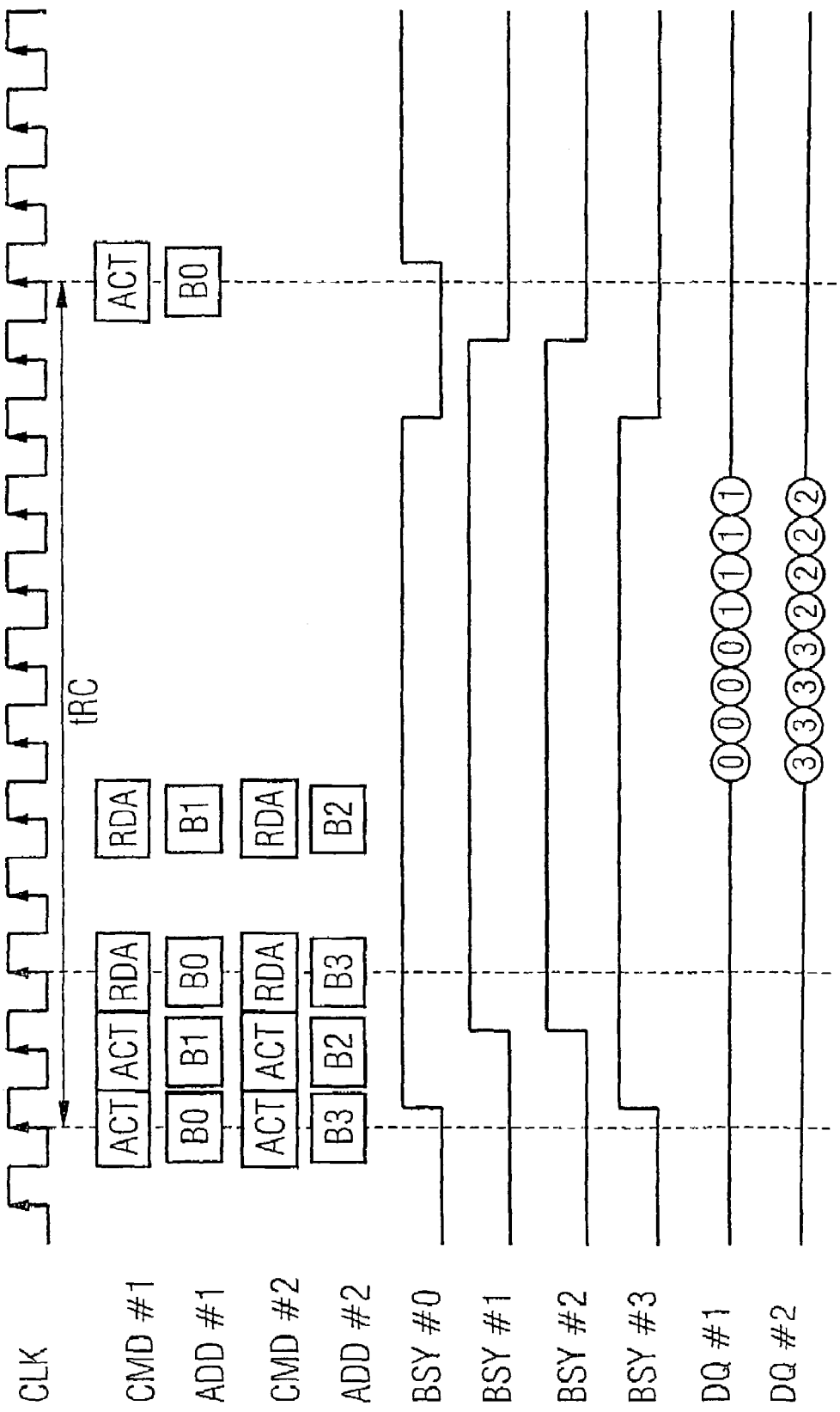

The signal diagram shown in FIG. 5 is used to show parallel access by the processor units 1 and 2 to the memory banks B0 to B3. Port P1 is used to access the memory banks B0 and B1 using the access commands ACT and read commands RDA in succession. Port P2 is used to access the memory banks B2 and B3 using the access commands ACT and read commands RDA in succession. Any access to the respective memory bank involves the corresponding control signal BSY associated with this memory bank being set. At the respective times, as explained with reference to FIG. 3, the respective control signal BSY is reset. The data in the memory banks B0 and B1 are output in succession via port P1, and in parallel with this the data in the memory banks B2 and B3 are output in succession via port P2.

Figure 6:
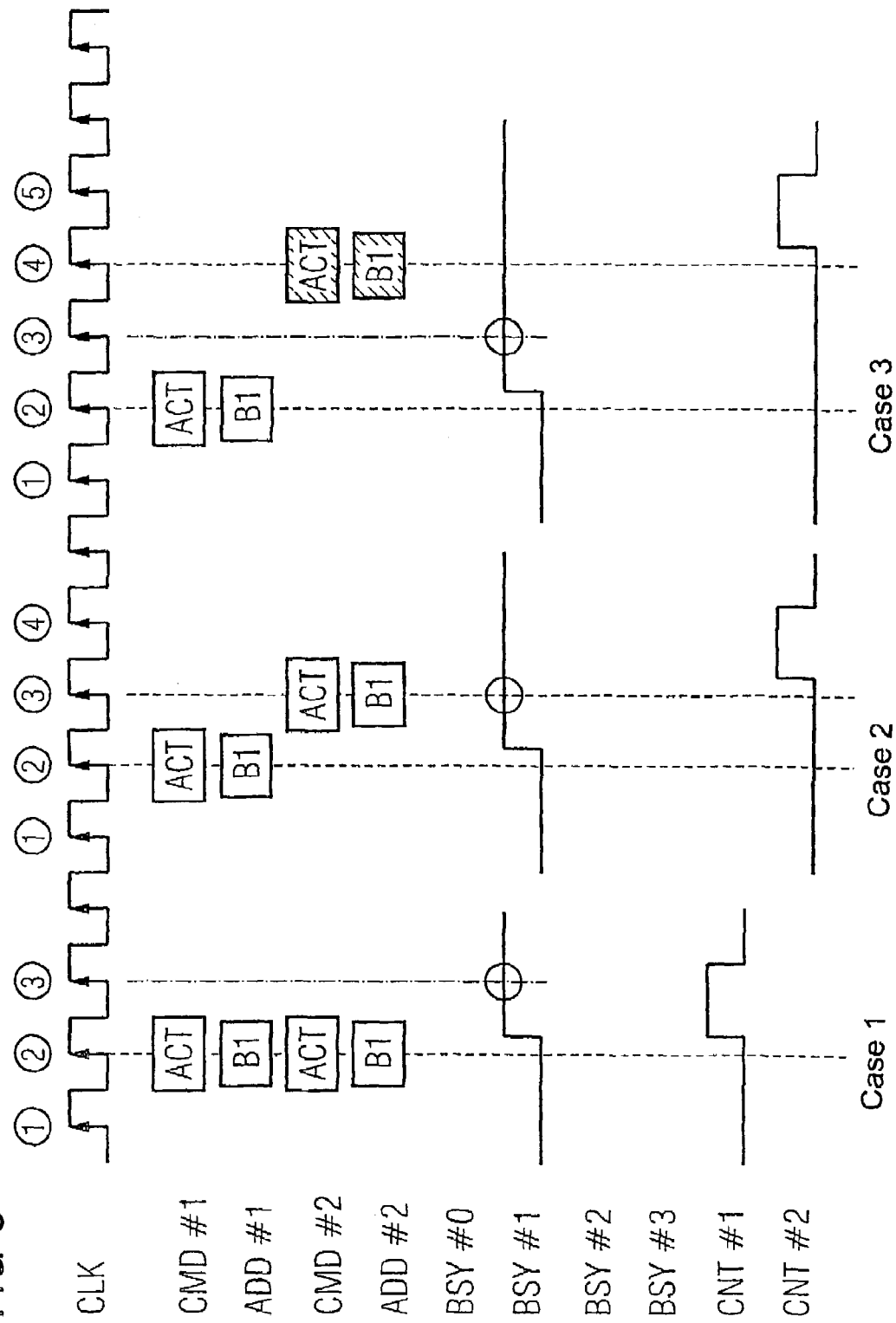

The signal diagram shown in FIG. 6 is used to show three further cases of different access operations. In case 1, memory bank B1 is accessed simultaneously both via port P1 and via port P2. At time (1), each of the processor units 1, 2 checks the state of the control signal BSY#1 associated with the memory bank B1. Since this signal has not been set, a respective access command ACT for memory bank B1 is produced at time (2). At time (3), both processor units 1, 2 note that the control signal BSY#1 has been set. In this case, an access collision occurs between access to the memory bank B1 via port P1 and access to the same memory bank B1 via port P2. In this case, it is necessary to decide which of the ports P1, P2 has priority for access in the event of an access collision. In case 1, shown in FIG. 6, access via port P2 has priority. The control signal CNT#1 is set. This means that access via port P1 is ignored for access by the memory. Access to memory bank B1 via P1 is stopped by the processor unit 1, and access via port P2 is continued.

In case 2, as shown in FIG. 6, the processor unit 2 checks at time (3), precisely at the same time as it sends the access command ACT, the state of the control signal BSY#1. In this case too, an access collision arises between a plurality of access operations to memory bank B1. In this case, the control signal CNT#2 is set at time (4). The access to port P1 which has been started is continued, and the access to port P2 is ignored by the memory ("first come, first served").

In case 3, processor unit 2 checks the control signal BSY#1 before an access command ACT is sent. In the present case, however, in a departure from the specification, an access command ACT for memory bank B1 is nevertheless sent. In this case, the control signal CNT#2 is set at time (5), and access via port P2 is ignored by the memory, while access via port P1 is continued. As can be seen from the cases shown in FIG. 6, the control signal CNT#1 or CNT#2 is necessary only in case 1; in the other two cases, the control signal BSY#1 is sufficient for access control, in principle.

The signal diagram shown in FIG. 7 is used to show another four cases of different access operations to the memory 3. In case 1, the processor unit 1 had no time to check the signal BSY#1. In this case, an access collision occurs between a refresh mode on memory bank B1 and access via port P1 likewise to memory bank B1. The control signal CNT#1 is set and the access command ACT for port P1 is ignored. The processor unit 1 is informed about the set signal BSY#1 at time (2). The signal CNT#1 is set at time (3).

In case 2, a similar situation arises to that in case 1, but at the same time (1). The access command ACT at port P1 is ignored, and the processor unit 1 in question is informed about CNT#1 at time (2).

In case 3, the access command ACT for accessing memory bank B1 has already been sent. After the time tRC, the memory bank B1 is automatically closed and the refresh mode is implemented on memory bank B1, with the control signal BSY#1 being set for a further time rTC.

In case 4, a read command RDA for memory bank B1 is initiated. Using the control signal CNT#1, the memory indicates to the processor unit 1 that no further read command can be accepted. Next, a precharge operation is automatically performed. After that, the refresh command is executed, with the control signal BSY#1 being set for a further time period tRC.

The processor units 1 and 2 and the memory 3 can, in principle, interact such that a refresh mode for each of the memory banks B0 to B3 can be controlled by one of the processor units 1, 2. When the control signals BSY and CNT are provided, however, it is also possible for the memory to control the refresh mode for each of the memory banks without the involvement of the processor units. The functionality is similar to in the cases described in more detail above. One difference, however, is that the refresh command REF is produced internally in the memory.

The signal diagram shown in FIG. 8 is used to show further cases of different access operations. In case 1, an access command ACT for memory bank B1 has been initiated via port P2 after an internal refresh mode on the same memory bank has been initiated at this point. In this case, the signal CNT#2 is set. The access command for memory bank B1 is ignored by the memory. Memory bank B3 is accessed in parallel via port P1.

In case 2, a refresh mode is implemented on memory bank B3. At the same time, an access command ACT for memory bank B3 is initiated via port P1. The control signal CNT#1 is produced in order to indicate to the processor unit 1 that access to memory bank B3 on account of the access command is not being implemented by the memory. At the same time, the memory bank B0 is accessed via port P2. Had another access command for memory bank B3 been initiated via port P2 at the same time instead of the memory bank B0 being activated, a double access collision would occur. In this case, both signals CNT#1 and CNT#2 would be set and none of the access commands via port P1 and port P2 would be accepted by the memory.

In case 3, a refresh mode is implemented on memory bank B0 after an access command ACT for memory bank B0 has been initiated via port P1. The control signal CNT#1 is set in order to indicate to the processor unit 1 that access to memory bank B0 is being terminated by the memory. No read or write command for memory bank B0 is accepted while the control signal BSY#0 has been set. In parallel with this, an access command for memory bank B2 is executed via port P2. One clock cycle later, the processor unit 1 initiates an access command for memory bank B2 via port P1. However, the processor unit 1 cannot use the signal CNT#1 for checking an access collision, because this signal has already been used in order to indicate the access collision for memory bank B0. In this case, the processor unit 1 needs to check the control signal BSY#2 in order to establish that the access command for memory bank B2 via port P1 is being ignored by the memory.

In case 4, a read operation is executed via port P2 until the signal CNT#2 is set. After that, the memory bank is precharged and a refresh mode on this memory bank is implemented.

In the case of the exemplary embodiments explained, the refresh mode has been implemented bank by bank. If the refresh mode for a memory bank is controlled by one of the processor units, this means that the respective memory bank address needs to be transmitted. One alternative is to implement a refresh mode for all the memory banks at the same time. In this case, instead of one memory bank, all the memory banks need to be precharged. The number of refresh commands is reduced in this case (by a factor of 4 in the case of the exemplary embodiments cited), but this entails a certain degree of restriction on the flexibility for controlling the memory's refresh mode.

I claim:

1. An integrated memory, comprising:
   a memory cell array containing a plurality of memory banks each with respective memory cells;
   at least a first and a second independently operated connection panel for external communication with the memory each connected to a respective command and address bus and to a respective data bus;
   a plurality of switches each assigned to a respective one of said memory banks for selectively connecting each one of said memory banks with a respective said data bus;
   a control circuit for external access to said memory banks, said control circuit being configured to:
     produce a number of first control signals, a respective one of said memory banks being assigned one of the first control signals and upon occurrence of an access to said memory bank assigned thereto, said first control signal indicating the access; and
     produce a first one and a second one of second control signals, the first one of the second control signals being assigned to the first connection panel and the second one of the second control signals being assigned to the second connection panel;
     produce the first one of the second control signals upon detecting an access collision to one of said memory banks such that when access to one of the memory banks via the second connection panel is already present, access to the same said memory bank is requested via the first connection panel; and
     produce the second one of the second control signals upon detecting an access collision to one of said memory banks such that when access to one of the memory banks via the first connection panel is already present, access to the same said memory bank is requested via the second connection panel;
     produce the first one of the second control signals upon an access collision occurring between a refresh mode on one of said memory banks and an access requested to the same memory banks via the first connection panel; and
     produce the second one of the second control signals upon an access collision occurring between a refresh mode on one of said memory banks and an access requested to the same memory banks via the second connection panel;

external contacts, the first and second control signals being supplied to said external contacts for providing the first and second control signals externally of the integrated memory.

2. The integrated memory according to claim 1, wherein said control circuit is configured to drive said memory cell array such that one of said memory banks is connected to one of said connection panels if an access command on the command bus is applied to said one connection panel for accessing said one memory bank.

3. The integrated memory according to claim 1, wherein, upon access to one of said memory banks, said control circuit sets a control signal of the first control signals associated with said one memory bank and resets the control signal before acceßs has ended.

4. The integrated memory according to claim 1, wherein a control signal of the second control signals produced by said control circuit in the event of an access collision indicates which of said connection panels should be ignored for access to said memory banks.

5. The integrated memory according to claim 1, which comprises an externally programmable register circuit for storing an information item regarding which of said connection panels is prioritized for access in an event of an access collision, and for outputting the stored information item to said control circuit.

6. A circuit configuration, comprising:
an integrated memory according to claim 1;
at least two processor units respectively connected to a different one of said connection panels, connected to receive at least one of the first and second control signals, and accessing said memory independently of one another in dependence on the first and second control signals.

7. The circuit configuration according to claim 6, wherein said at least two processor units access different said memory banks in parallel.

8. The circuit configuration according to claim 6, which comprises an externally programmable register circuit forming a part of said memory, said register circuit being programmable by one of said processor units with an information item defining which of said connection panels has priority for access in an event of an access collision.

9. The circuit configuration according to claim 6, wherein said processor units and said memory interact such that a refresh mode for each of said memory banks can be controlled by one of said processor units.

10. The circuit configuration according to claim 6, wherein said memory is configured to enable a refresh mode to be controlled for each of said memory banks without involvement of said processor units.

11. The circuit configuration according to claim 6, wherein said processor units are configured to check, in each case before access to said memory, whether one of the first control signals has been set, and, if one of the first control signals has been set, not to access said memory bank associated with the first control signal.

12. The circuit configuration according to claim 6, wherein said processor units are configured to check, in each case before access to said memory, whether one of the second control signals has been set, and, if one of the second control signals has been set, not to access or to interrupt access via one of said connection panels.

* * * * *